United States Patent
Channapatana

(10) Patent No.: US 10,804,756 B2
(45) Date of Patent: Oct. 13, 2020

(54) STATORS COMPRISING AIR FLOW SLOTS WITH ADJACENT WINDING SLOTS

(71) Applicant: Toshiba International Corporation, Houston, TX (US)

(72) Inventor: Chetan Channapatana, Cypress, TX (US)

(73) Assignee: Toshiba International Corporation, Houston, TX (US)

( * ) Notice: Subject to any disclaimer, the term of this patent is extended or adjusted under 35 U.S.C. 154(b) by 27 days.

(21) Appl. No.: 15/658,609

(22) Filed: Jul. 25, 2017

(65) Prior Publication Data
US 2019/0036393 A1    Jan. 31, 2019

(51) Int. Cl.
| | |
|---|---|
| *H02K 9/02* | (2006.01) |
| *H02K 1/20* | (2006.01) |
| *H02K 1/16* | (2006.01) |
| *H02K 3/24* | (2006.01) |

(52) U.S. Cl.
CPC .............. *H02K 1/20* (2013.01); *H02K 1/165* (2013.01); *H02K 3/24* (2013.01); *H02K 9/02* (2013.01); *H02K 2213/03* (2013.01)

(58) Field of Classification Search
CPC ............ H02K 1/20; H02K 1/165; H02K 9/02; H02K 1/16; H02K 9/00; H02K 9/005; H02K 9/04; H02K 9/06; H02K 3/24; H02K 5/20; H02K 2213/03
USPC ....... 310/214, 215, 216.001–216.137, 52–64
See application file for complete search history.

(56) References Cited

U.S. PATENT DOCUMENTS

| | | | | |
|---|---|---|---|---|
| 2,661,434 A | * | 12/1953 | Kilbourne | H02K 9/005 310/64 |
| 2,664,512 A | * | 12/1953 | Huntley | H02K 3/24 310/64 |
| 3,488,532 A | * | 1/1970 | Anderson | H02K 3/24 310/58 |
| 4,152,610 A | * | 5/1979 | Wallenstein | H02K 3/24 310/214 |
| 4,298,812 A | * | 11/1981 | Damiron | H02K 3/24 310/214 |
| 8,362,661 B2 | * | 1/2013 | DeBlock | H02K 1/20 310/52 |
| 8,847,445 B2 | * | 9/2014 | Kowalski | H02K 1/32 310/58 |
| 2004/0135441 A1 | * | 7/2004 | Groening | H02K 1/20 310/58 |
| 2010/0019626 A1 | * | 1/2010 | Stout | H02K 1/02 310/60 A |
| 2014/0091653 A1 | | 4/2014 | Saitou | |
| 2015/0084457 A1 | | 3/2015 | Lang et al. | |
| 2015/0091398 A1 | * | 4/2015 | Bradfield | H02K 9/19 310/54 |

(Continued)

*Primary Examiner* — Maged M Almawri
(74) *Attorney, Agent, or Firm* — Baker Botts L.L.P.

(57) ABSTRACT

Presently disclosed embodiments are directed to systems and apparatuses comprising a stator core having air flow slots for cooling. Specifically, the disclosed embodiments utilize a stator comprising laminated core having an inner circumference, a plurality of winding slots in the laminate core extending radially from the inner circumference, at least one air flow slot in the laminate core, wherein the at least one air flow slot is fluidly connected to at least one winding slot, and a winding located in the plurality of winding slots.

14 Claims, 2 Drawing Sheets

(56) References Cited

U.S. PATENT DOCUMENTS

2015/0372566 A1* 12/2015 Airoldi .................. H02K 9/04
 290/55
2016/0301286 A1 10/2016 Salter et al.

* cited by examiner

STATORS COMPRISING AIR FLOW SLOTS WITH ADJACENT WINDING SLOTS

TECHNICAL FIELD

Embodiments of the present disclosure relate to stators used in electric machines and, more particularly, systems and apparatuses comprising a stator core having air flow slots for cooling.

BACKGROUND

During operation, heat is generated by losses in the winding and the stator core of an electrical machine, such as a motor. These losses may be due to, for example, electrical resistance in the winding and often take the form of thermal energy. This thermal energy must be removed by thermal conduction out of the stator core. Air may often be used to cool the winding and the stator core. Therefore, it is now recognized that a need exists for an efficient means for increasing air flow near the windings in the stator core for cooling.

SUMMARY

In accordance with the above, presently disclosed embodiments are directed to systems and apparatuses comprising a stator core having air flow slots for cooling. In certain embodiments, the apparatuses of the present disclosure may comprise a stator core having an inner circumference. The stator core may comprise a plurality of slots extending radially from the inner circumference. The slots may comprise winding slots and air flow slots. In certain embodiments, a winding may be located in the winding slots. The air flow slots may be unobstructed by the winding so as to allow for the flow of air there through. In certain embodiments, the systems of the present disclose may comprise a shaft, a rotor fitted on the shaft, and a stator of the present disclosure, wherein the rotor is mounted for rotation within the stator. In certain embodiments, systems and apparatuses disclosed herein may allow for efficient and improved cooling of the winding and/or the stator core.

BRIEF DESCRIPTION OF THE DRAWINGS

For a more complete understanding of the present disclosure and its features and advantages, reference is made to the following description, taken in conjunction with the accompanying drawings, in which.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only and not exhaustive of the scope of the disclosure.

DETAILED DESCRIPTION

Illustrative embodiments of the present disclosure are described in detail herein. In the interest of clarity, not all features of the actual implementation are described in this specification. It will of course be appreciated that in the development of any such embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of this disclosure. Furthermore, in no way should the following examples be read to limit or define the scope of the disclosure.

Figure 1:
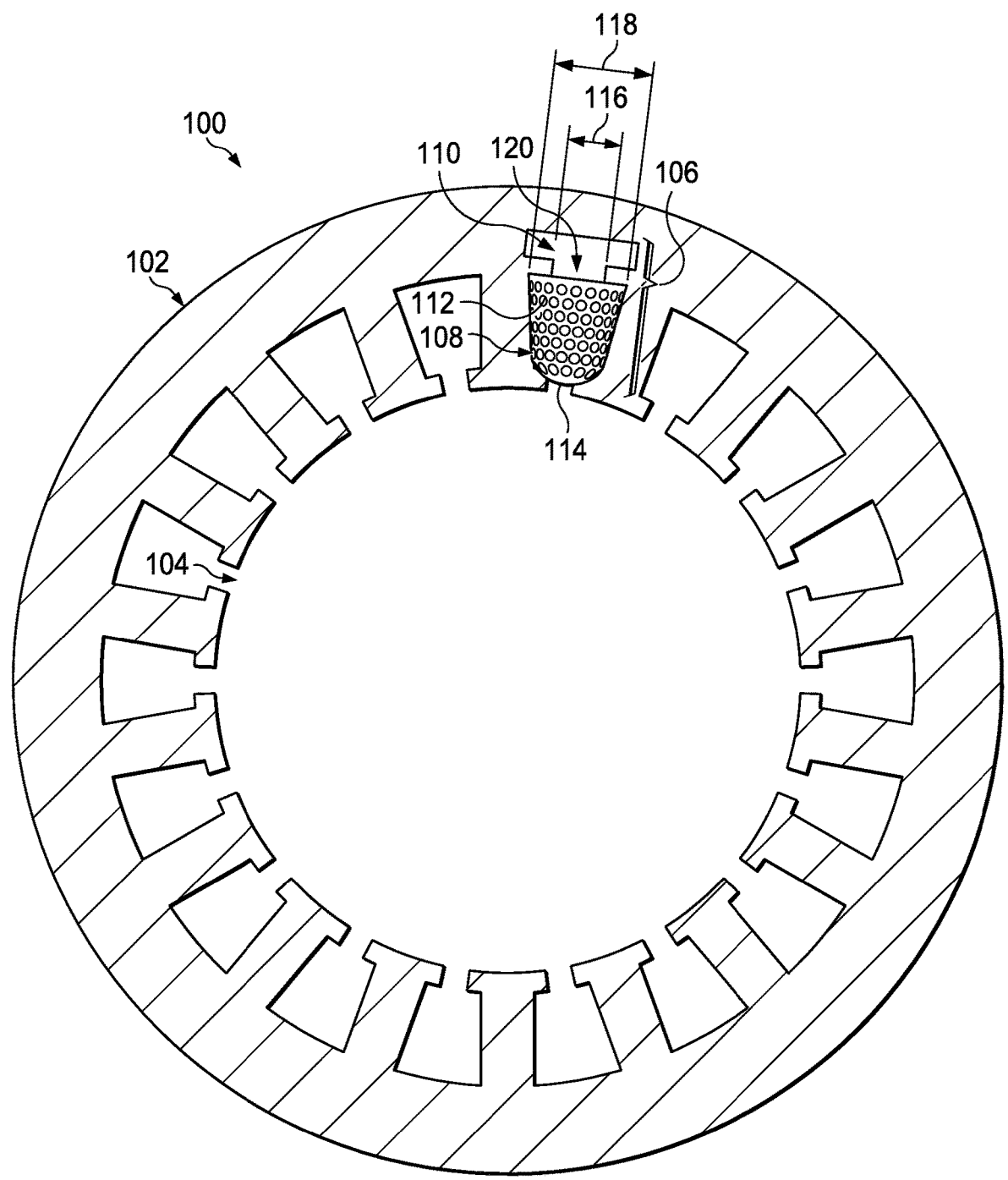
FIG. 1 is an illustrative drawing of a stator in accordance with certain embodiments of the present disclosure.

Turning now to the drawings, FIG. 1 illustrates a stator 100 of the present disclosure. As shown, the stator 100 may comprise a stator core 102. The stator core 102 may be a laminated core comprising a plurality of laminations (not shown). The stator core 102 may have an inner circumference 104. The stator core 102 may comprise a plurality of winding slots 108 that extend radially from the inner circumference 104. As used herein, the term "plurality" refers in a non-limiting manner to any integer equal or greater than one.

The stator core 102 may also comprise at least one air flow slot 110. In certain embodiments, the air flow slot 110 may be fluidly connected to at least one winding slot 108. As used herein, "fluidly connected" means a fluid, such as air, may freely pass between one component of the stator 100 (e.g., the air flow slot 110) to another component of the stator 100 (e.g., the winding slot 108). In certain embodiments, the air flow slot 110 may be adjacent to at least one winding slot 108. As used herein, "adjacent" refers to the proximity of two components of the stator 100 to each other. Such components that are identified as being adjacent may be abutting or may also be near or close to each other without necessarily contacting each other. Although referred to herein as a winding slot 108 and an air flow slot 110, a single slot 106 may comprise a winding portion 108 and an air flow portion 110.

The stator 100 may further comprise a winding 112. The winding 112 may be located in the plurality of winding slots 108. In certain embodiments, the winding 112 may comprise a plurality of coils. The winding 112 may be of substantially similar size and shape as the winding slots 108. In certain embodiments, the stator 100 may further comprise a plurality of wedges 114 located in one or more winding slots 108 in the plurality of winding slots. The wedges 114 may secure the winding 112 into position within one or more winding slots 108.

In certain embodiments, the width of the portion of the air flow slot 110 nearest in proximity to the winding slot 108 (i.e., the width 116 of the air flow slot 110) may be smaller than the width of the portion of the winding slot 108 nearest in proximity to the air flow slot 110 (i.e., the width 118 of the winding slot 108). Such structure may prevent the winding 112 from entering the air flow slot 110 so that the air flow slot 110 is unobstructed by the winding 112, which in turn allows for maximum air flow through the air flow slot 110.

For instance, as shown in FIG. 1, the air flow slot 110 may comprise an indented section 120, which has a narrower width 116 than both the remaining portion of the air flow slot 110 and the width 118 of the winding slot 108. The indented section 120 may be immediately adjacent and/or fluidly connected to the winding slot 108. Although FIG. 1 depicts a particular size and shape of the air flow slot 110, it will be understood by a person having ordinary skill in the art with the benefit of this disclosure that the size and/or the shape of the air flow slot 110 may be varied. Suitable shapes include, but are not limited to, an indented shape as depicted in FIG. 1, a wedge shape similar to the shape of the winding slot 106 depicted in FIG. 1, a substantially oval or circular shape, a rounded or curved shape, a rectangular shape, a square shape, or any combination thereof.

Figure 2:
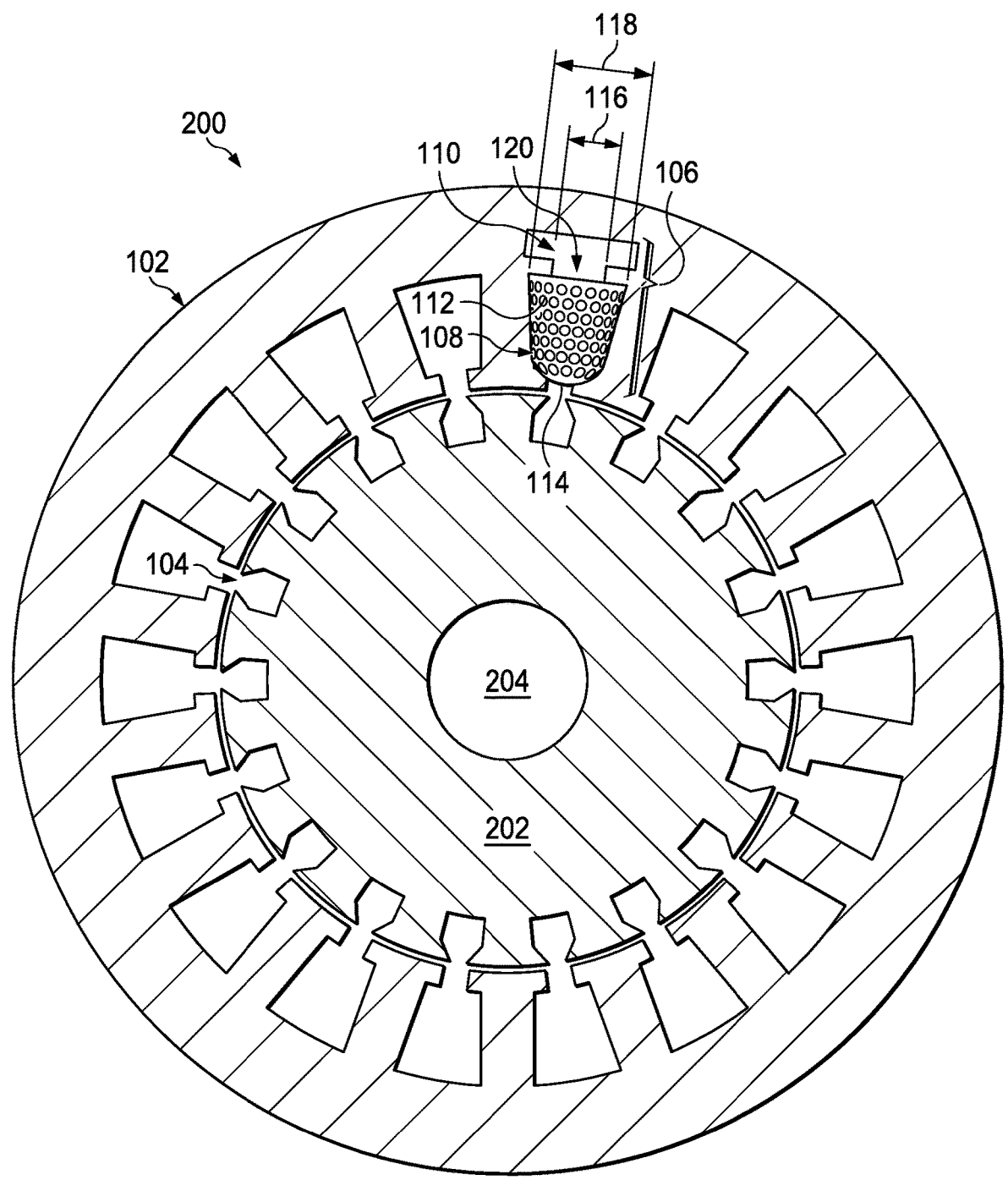
FIG. 2 is an illustrative drawing of a stator and a rotor of an electric motor in accordance with certain embodiments of the present disclosure.

FIG. 2 illustrates an electric motor 200 of the present disclosure. The electric motor 200 may comprise a shaft (not shown), a rotor 202, and a stator 100 as described above. The rotor 202 may be mounted for rotation within the stator 100 and fitted on the shaft (e.g., at 204) for rotation. During operation of electric motor 200, heat may be generated by, for example, losses in the winding 112 and/or the stator core 102. Air may flow through the air flow slot 110 and absorb the heat to cool the winding 112 and/or the stator core 102. The positioning of the air flow slot 110 adjacent and/or fluidly connected to the winding slot 108 may enhance the ability to cool the winding 112 and/or stator core 102 because the air may directly contact the winding 112.

Although FIGS. 1 and 2 depict the stator 100 as having only one air flow slot 110 in the stator core 102, the stator 100 may have any number of air flow slots 110 in the stator core 102. For instance, each winding slot 108 in the plurality of winding slots may have an adjacent and/or fluidly connected air flow slot 110. It will be understood by a person having ordinary skill in the art with the benefit of this disclosure that the cooling achieve by the air flow slots may increase as the number of air flow slots 110 in the stator core 102 increases.

Among the other benefits discussed herein, the stators comprising air flow slots of the present disclosure may be manufactured such that the air flow slot is punched into the stator core laminations at the same time as the winding slot. Thus, the stators of the present disclose may be manufactured in an efficient manner without requiring the addition of a step to existing manufacturing processes known in the art.

Although the present disclosure and its advantages have been described in detail, it should be understood that various changes, substitutions and alterations can be made herein without departing from the spirit and scope of the disclosure as defined by the following claims.

What is claimed is:

1. A stator comprising: a laminated core having an inner circumference; a plurality of winding slots in the laminate core extending radially from the inner circumference, wherein both sides of each one of the plurality of winding slots are angled towards each other; at least one air flow slot in the laminate core, wherein the at least one air flow slot is fluidly connected to at least one winding slot, wherein the at least one air flow slot is unobstructed in relation to the at least one winding slot, wherein the at least one air flow slot comprises an indented section, wherein the width of the indented section is substantially uniform in relation to the height of the indented section, wherein the indented section is adjacent to the at least one winding slot, wherein the indented section is fluidly connected to both the at least one air flow slot and the at least one winding slot; and a winding located in the plurality of winding slots, wherein the air flow slot has a maximum circumferential width that is larger than a maximum circumferential width of the winding slot, the width of the indented section is smaller than the maximum circumferential width of the winding slot.

2. The stator of claim 1 wherein the indented section prevents the winding from entering the air flow slot.

3. The stator of claim 1 wherein the winding comprises a plurality of coils.

4. The stator of claim 1 further comprising a plurality of wedges located in one or more winding slots in the plurality of winding slots, wherein the wedges are disposed at an opposite end in the one or more winding slots from the at least one air flow slot.

5. A stator comprising: a stator core comprising a plurality of laminations, wherein the stator core has an inner circumference; at least one slot extending radially from the inner circumference of the stator core comprising: a winding portion, wherein both sides of the winding portion are angled towards each other; and an air flow portion, wherein the air flow portion is unobstructed in relation to the winding portion, wherein the air flow portion comprises an indented section, wherein the width of the indented section is substantially uniform in relation to the height of the indented section, wherein the indented section is adjacent to the winding portion, wherein the indented section is fluidly connected to both the air flow portion and the winding portion; and a winding arranged through the winding portion, wherein the air flow portion has a maximum circumferential width that is larger than a maximum circumferential width of the slot, the width of the indented section is smaller than the maximum circumferential width of the slot.

6. The stator of claim 5 wherein the winding comprises a plurality of coils.

7. The stator of claim 5 further a wedge located in the winding portion, wherein the wedge is disposed at an opposite end in the winding portion from the air flow portion.

8. The stator of claim 5 wherein the indented section prevents the winding from entering the air flow portion.

9. The stator of claim 8 wherein the indented section has a width smaller than a width of the winding portion.

10. An electric motor comprising: a shaft; a rotor fitted on the shaft; and a stator that comprises: a laminated core having an inner circumference; at least one slot extending radially from the inner circumference of the laminated core, the at least one slot comprising a winding portion and an air flow portion, wherein both sides of the winding portion are angled towards each other, wherein the air flow portion is unobstructed in relation to the winding portion, wherein the air flow portion comprises an indented section, wherein the width of the indented section is substantially uniform in relation to the height of the indented section, wherein the indented section is adjacent to the winding portion, wherein the indented section is fluidly connected to both the air flow portion and the winding portion; and a winding arranged through the winding portion, wherein the rotor is mounted for rotation within the stator, wherein the air flow Portion has a maximum circumferential width that is larger than a maximum circumferential width of the slot, the width of the indented section is smaller than the maximum circumferential width of the slot.

11. The electric motor of claim 10 wherein the winding comprises a plurality of coils.

12. The electric motor of claim 10 wherein the indented section prevents the winding from entering the air flow portion.

13. The electric motor of claim 10 wherein the indented section has a width smaller than a width of the winding portion.

14. The electric motor of claim 10 further a wedge located in the winding portion, wherein the wedge is disposed at an opposite end in the winding portion from the air flow portion.

* * * * *